United States Patent Office 3,101,415
Patented Aug. 20, 1963

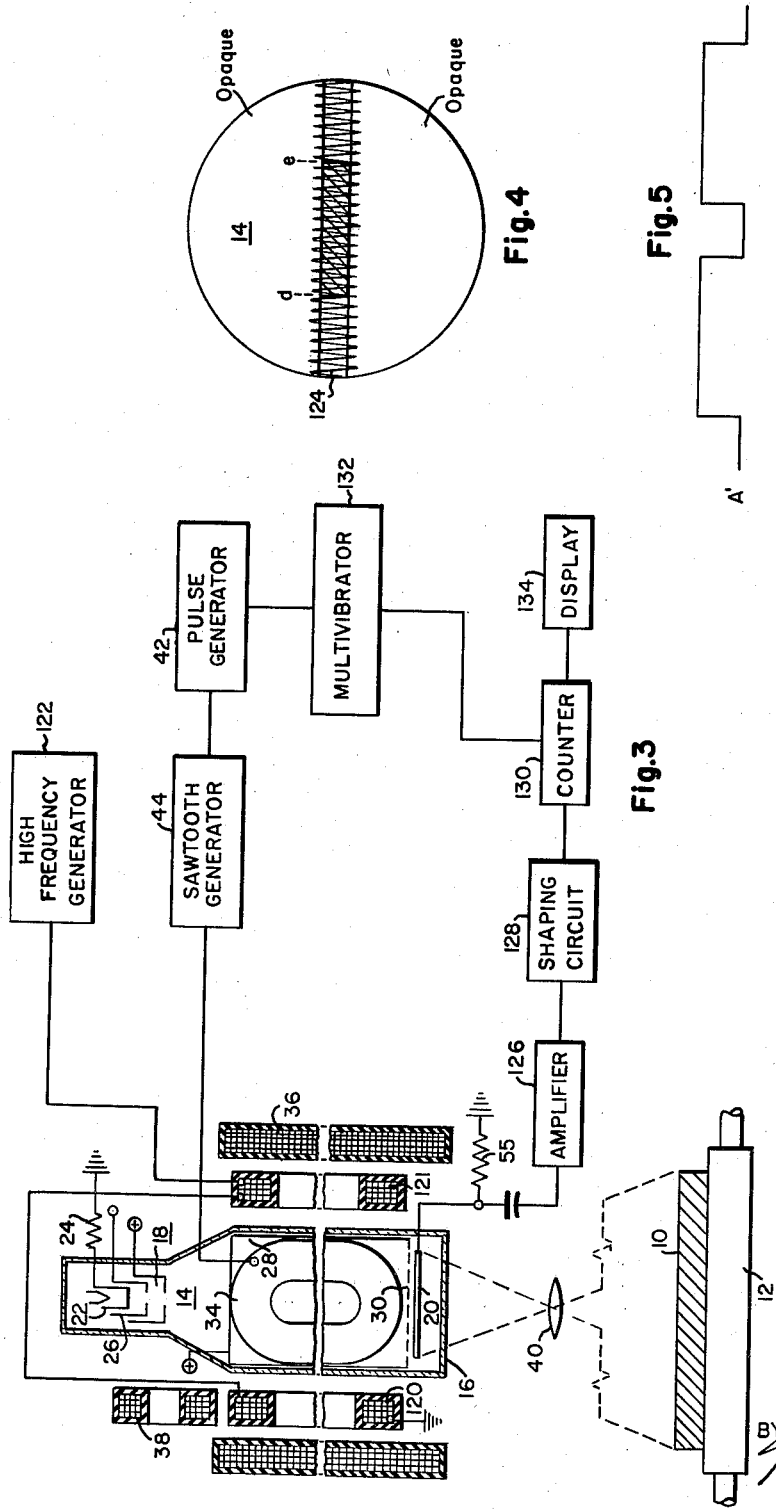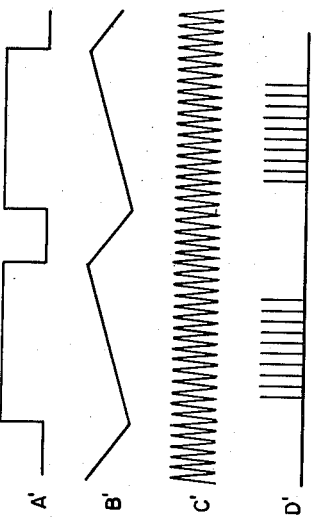

3,101,415
RADIANT ENERGY SENSITIVE NON-CONTACTING DIMENSIONAL GAGE
Rudolph Steven Libenschek, Pittsburgh, Pa., assignor to Jones & Laughlin Steel Corporation, Pittsburgh, Pa., a corporation of Pennsylvania
Filed Mar. 10, 1960, Ser. No. 14,057
11 Claims. (Cl. 250—219)

This invention relates to non-contacting width gages for articles having a different light intensity than the background surrounding them such as, for example, irradiant or illuminated reflective bodies.

As an overall object, the invention seeks to provide a new and improved non-contacting width gage employing an electron-optics device as a primary detecting element. As is well known, it is sometimes necessary to measure the width or other dimension of an article by non-contacting techniques as, for example, where the object being measured is at a very high temperature. If the body being measured has a different light intensity than the background surrounding it such as an irradiant steel slab or an externally illuminated object, non-contacting dimensional measurements may be obtained by the use of an electron-optics device wherein the light intensity from the object being measured will produce an electrical image on a photosensitive surface. By scanning this surface with an electron beam, an electrical signal may be produced which varies in some particular as a function of the width of the electrical image and, hence, the width of the object being measured. This principle is used in the present invention to produce a non-contacting gage having especially good operational characteristics.

Still another object of the invention is to provide a non-contacting width gage in which the electron beam of an electron-optics device is modulated as it sweeps across a photosensitive target to produce a pulsed output signal on the target itself in which the number of pulses is proportional to the width of the dimension being measured.

As will become apparent from the following description, the invention employs, as a primary detecting element, a television camera tube having a photosensitive target across which an electron beam is swept. In one illustrative embodiment of the invention, a vidicon camera tube is used as the photosensitive pick-up device and is operated with single line scanning in the plane in which the dimension is being taken. A high frequency oscillator modulates the scanning beam as it passes over the electrical image resulting from the light emanating from the irradiant or reflective object being measured. The modulated beam, by intermittently discharging the electrical image, produces a train of pulses proportional to the width of the object viewed. This signal, after suitable shaping, is applied to a series of digital decade counters. In this manner, a continuous indication of the dimension being measured may be obtained and utilized for control or monitoring purposes.

In another embodiment of the invention, a vidicon camera tube is again used as the photosensitive pick-up device, but in this case the face of the tube is masked off to permit only a narrow band of light to fall on the photosensitive signal plate of the vidicon in the plane in which the dimension is to be taken. Applied to the deflection system of the tube are two signals; a linear sweep in the plane of the slot in the mask, and a high frequency signal perpendicular to this plane. The electrical charge pattern resulting from the light emanating from the irradiant or reflective object being measured is then scanned by the electron beam. The high frequency signal causes the beam to cross back and forth over the image, producing a train of pulses proportional to the width of the object being viewed, with the pulses being produced only when the beam is discharging the image. This signal, after suitable shaping, is applied to a series of digital decade counters which, as in the embodiment of the invention first described, will give a continuous indication of the dimension being measured.

Although the embodiments of the invention shown and described herein employ vidicons as the photosensitive pick-up device, it will be readily apparent that other and different pick-up devices may be used with equal effectiveness such as, for example, an image dissector.

The above and other objects and features of the invention will become apparent from the following detailed description taken in connection with the accompanying drawings which form a part of this specification and in which:

FIG. 3 is an illustration of another embodiment of the invention which does not incorporate means for averaging dimensional readings;

FIG. 4 is an end view of the face plate of the vidicon tube shown in FIG. 3, illustrating the manner in which the face plate is masked to allow only a narrow beam of light to fall upon the signal plate of the vidicon; and FIG. 5 is an illustration of wave forms appearing at various points in the circuit of FIG. 3.

Figure 1:
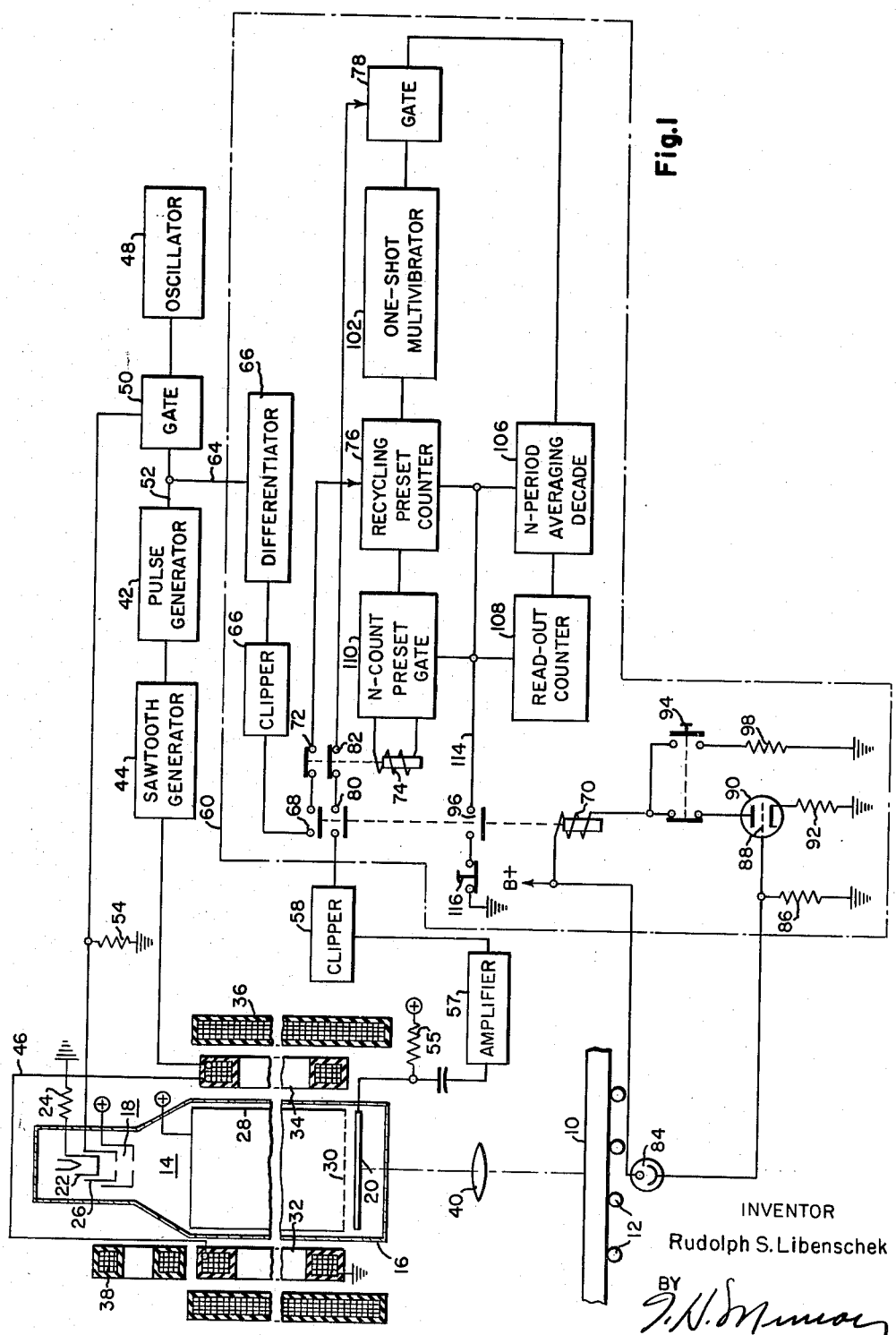
FIG. 1 is a schematic illustration of one embodiment of the invention shown in combination with counting means for averaging dimensional readings taken along the length of a moving irradiant or illuminated body.

Referring to FIG. 1, the object being measured is illustrated as an irradiant hot steel slab 10 which, as will be understood, travels parallel to the plane of the drawing on conveyor rolls 12. Although an irradiant slab is shown herein for illustrative purposes, it should be understood that the object being measured may be a reflective body which is illuminated by external means, the important thing being that the object has a different light intensity than the background surrounding it.

Disposed above the object 10 is a vidicon tube, generally indicated at 14. As shown, the vidicon consists of an evacuated glass cylinder 16 containing an electron gun 18 at one end and a photoconductive signal plate or target 20 at the other end. The electron gun 18 consists of an indirectly heated cathode 22 connected to ground through resistor 24, a control grid 26, and a wall or focusing anode 28. The focusing anode 28, being cylindrical in shape, extends for most of the length of the tube and is connected to a screen 30 situated near the photoconductive target 20. The target 20 comprises a light sensitive element consisting of a thin layer of photoconductive material deposited on a signal electrode. Line deflection coils 32 and 34 are disposed on opposite sides of the tube and are surrounded by a focusing coil 36 which produces an axial magnetic field for the electron beam. A small alignment coil 38 is situated opposite the exit end of the electron gun 18. As shown, an image of the object 10 is focused on photoconductive signal plate 20 by means of lens 40.

The vidicon 14 is controlled by circuitry including a pulse generator 42 and a sawtooth generator 44. The output of pulse generator 42 is a series of square wave pulses, all of equal pulse width, which appear as wave form A in FIG. 2. These pulses are used to control the sawtooth generator 44 which produces the wave form B shown in FIG. 2. Wave form B is applied across the deflection coils 32 and 34 via lead 46 in a series circuit arrangement and comprises a train of rising current excursions which cause the electron beam of the vidicon to sweep across the signal plate 20 in a direction perpendicular to the plane of the drawing and then return to its starting position during a dwell time when the wave form B returns to its initial current level. Thus, between points *a* and *b* shown in FIG. 2, the electron beam produced by the electron gun 18 will be swept across signal plate 20. Between points *b* and *c*, however, the electron beam will be returned to its initial starting position. It will be noted that the deflection coils 32 and 34 are positioned whereby the path of the electron beam in sweeping across signal plate 20 will be perpendicular to the direction of movement of object 10 and in the plane of the dimension which is to be measured, this dimension being the width of object 10 in the illustrated embodiment.

The control circuitry for vidicon 14 also includes a high frequency oscillator 48 and a gate circuit 50. As shown, the output of pulse generator 42 is fed via lead 52 to the gate circuit 50 as a gating signal. Consequently, the output of gate circuit 50 appearing across resistor 54 will be a series of successive groups of oscillations, with each group persisting for the duration of a pulse in wave form A. The signal across resistor 54, therefore, will appear as wave form C in FIG. 2; and, as shown, this signal is applied to the control grid 26 of electron gun 18. In wave form C the cut-off voltage of the vidicon is indicated at 56. Consequently, the groups of oscillations in wave form C modulate the electron beam as it scans over the signal plate 20. The modulated electron beam, by intermittently discharging the electrical image on signal plate 20, produces a group of pulses in which the number of pulses is proportional to the width of the irradiant or illuminated object being viewed. Thus, the video output signal on signal plate 20 will appear as wave form D in FIG. 2 wherein a group of pulses is superimposed upon a voltage pedestal during each sweep of the electron beam across the signal plate. It should be readily apparent that in order to produce the pulsed output in wave form D, the object 10 will have a brighter light intensity than the background surrounding it. As was explained above, this brighter light intensity may be due to the fact that the object is hot and irradiant, or it may have a reflective surface and be illuminated by external means to produce the same result. The video output signal appearing on signal plate 20 and across load resistor 55 is then amplified in amplifier 57 and passed to clipper 58 where the voltage pedestal is removed to produce wave form E in FIG. 2.

By counting the number of pulses in any one group of pulses in wave form E, an indication of the instantaneous width of object 10 may be obtained. That is, the number of pulses in any group of pulses in wave form E is proportional to the width of object 10 along the scanning line of the electron beam of vidicon 14. As object 10 moves along the conveyor rolls 12, its width may vary along the scanning line of the electron beam so that the number of pulses in any one group of pulses in wave form E may not be a true indication of the average width of the object. Accordingly, the output of clipper 58 may be applied to an averaging counter, enclosed by broken lines and generally indicated at 60, which will average the number of pulses appearing in successive groups of pulses in wave form E to produce an average indication of the width of the object 10.

Figure 2:
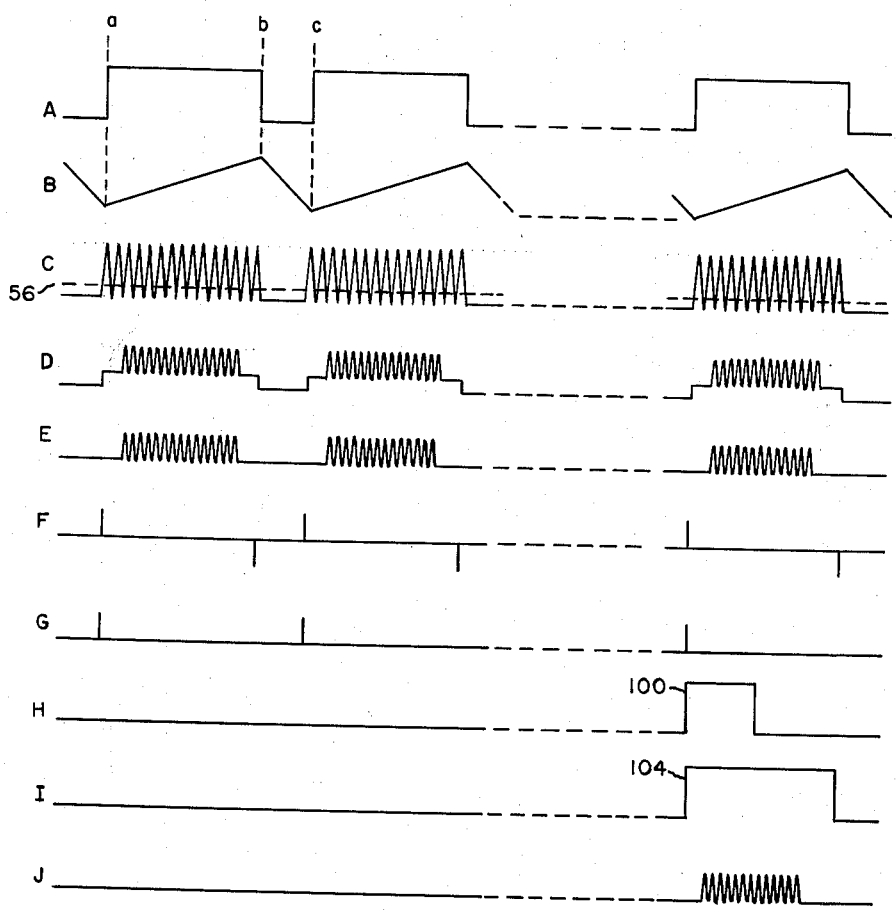
FIG. 2 is an illustration of wave forms appearing at various points in the circuit of FIG. 1.

Reverting now to the averaging counter 60, the output of pulse generator 42 appearing as wave form A in FIG. 2 is fed via lead 64 to a differentiator 66. Differentiator 66 will produce a sharp spiked pulse of positive polarity when the input wave form A changes in a positive direction and a sharp spiked pulse of negative polarity when the input signal changes in a negative direction. The output of the differentiator thus appears as wave form F in FIG. 2. This wave form is fed to a clipper 66 which eliminates the negative spiked pulses whereby the output of the clipper appears as wave form G in FIG. 2 where only the positive spiked pulses remain. These positive spiked pulses are passed through the normally open contacts 68 of relay 70 and the normally closed contacts 72 of relay 74 to a recycling preset counter circuit 76.

Turning, now, to clipper 58, its output is fed to a gate circuit 78 through the normally open contacts 80 of relay 70 and the normally closed contacts 82 of relay 74. Thus, the input to gate circuit 78 will be wave form E which consists of a plurality of groups of oscillations, the number of oscillations or pulses in each group being proportional to the instantaneous width of the object 10.

Positioned directly below the scanning line of the vidicon tube 14 and adjacent the conveyor rolls 12 is a photoelectric cell 84 which has its anode connected to a source of positive voltage, identified as B+, and its cathode connected through resistor 86 to ground. The cathode of cell 84 is also connected to the control grid 88 of an electron valve 90. This valve is included in the energizing circuit for relay 70 which includes resistor 92, the valve 90 and the closed contacts of push button switch 94. Normally, the voltage on grid 88 will be such that valve 90 will be cut off and relay 70 will remain deenergized. However, when the leading edge of the irradiant or illuminated object 10 passes beneath the vidicon 14, the photoelectric cell 84 will conduct to raise the voltage on grid 88, thereby energizing relay 70 and closing its normally open contacts 80, 68 and 96. As shown, the valve 90 is shunted by resistor 98 and the normally open contacts of push button switch 94. With this arrangement, the relay 70 may be manually energized by depressing the push button switch 94.

Referring again to the recycling preset counter 76, its output will appear as wave form H in FIG. 2 where a single pulse 100 is produced in response to a predetermined number of input pulses in wave form G. If the sweep frequency of the vidicon 14 is 60 cycles per second, then the counter 76 may be adjusted to produce the pulse 100 in response to 60 sweep cycles of the vidicon, or 60 pulses in wave form G. In this manner, a pulse will be produced at the output of counter 76 once each second. The counter circuit 76 may comprise any of the well-known devices for counting a predetermined number of input pulses. Counters of this type usually comprise a series of cascaded bistable multivibrator or flip-flop circuits together with appropriate feed-back loops in order to obtain a desired number of counts.

The output of counter 76 appearing as pulse 100 in wave form H is then fed to a one-shot multivibrator 102 which effectively lengthens the pulse 100 to produce the pulse 104 in wave form I in FIG. 2. The width of pulse 104 is equal to or slightly larger than the width of a group of pulses at the output of clipper 58. Pulse 104 is used in circuit 78 to gate the output of clipper 58 passing through contacts 80 and 82. Remembering that 60 groups of pulses are produced at the output of clipper 58 before a pulse 104 is produced in wave form I, every 60th group of pulses at the output of clipper 58 will pass through gate 78, and this occurs once every second. If the object 10 moves at the rate of two inches per second, then a sample of the width is obtained every two inches along the length of the object.

The output of gate circuit 78, appearing as wave form J in FIG. 2 and comprising a group of pulses from clipper 58, is passed to an N-period averaging decade 106 which will produce an output pulse in response to every ten input pulses from the gate circuit 78. A decade of this sort may comprise four bistable multivibrators connected in cascade together with appropriate feed-back loops in order to obtain a count of ten. The circuit 106, therefore, divides each group of pulses passing through gate 78 by ten. These pulses are then fed to a read-out counter 108 which indicates the width of the object 10 in feet and inches. The details of the read-out counter 108 may be had by reference to co-pending application Serial No. 862,676, filed December 29, 1959, now U.S. Patent No. 2,999,944, granted September 12, 1961, and assigned to the assignee of the present application.

Reverting again to the recycling preset counter 76, its output is also fed to an N-count preset gate 110 which is essentially a decade counter similar to counter 106. This counter, however, counts the pulses 100 occurring in wave form H once each second. After ten seconds have elapsed and ten pulses in wave form H have been fed to the N-count gate 110, it will actuate the relay 74 to open the normally closed contacts 72 and 82.

It will be noted that a ground connection 112 is provided for each of the counters 110, 76, 106 and 108, through lead 114, the normally open contacts 96 of relay 70 and push button switch 116. This ground connection is provided for the control grid of one of the two electron valves in each of the bistable multivibrator circuits provided in the various counters. Thus, when contacts 96 of relay 70 close, one of the two grids of the various bistable multivibrators will be grounded whereby the counting circuits will be reset to their initial counting conditions. That is, if it is assumed that counter 76 has counted 50 pulses when contacts 96 close, it will be reset whereby it will have to count another 60 pulses to produce an output pulse. Similarly, if counter 106 has counted 5 pulses, it will have to count another 10 pulses to produce an output pulse after the contacts 96 close. Consequently, by closing contacts 96, the circuit is conditioned whereby all of the counters must begin counting from zero.

Assuming that the object 10 has not yet passed beneath the vidicon 14 in its path of travel along the conveyor rolls 12, the photoelectric cell 84 will not conduct; and electron valve 92 will be cut off whereby relay 70 will be deenergized and contacts 80, 68 and 96 are open. During this time, relay 74 will be deenergized while contacts 72 and 82 remain closed. When the leading edge of the object 10 passes beneath the vidicon 14, however, the photoelectric cell 84 will conduct and raise the voltage on grid 88 whereby valve 90 will conduct to energize relay 70 and close contacts 80, 68 and 96. Closure of contacts 96 resets each of the counters 110, 76, 106 and 108 whereby the circuit is prepared to begin counting from zero.

As the electron beam of the vidicon 14 scans across the signal plate 20 many times per second, it will produce the wave form E at the output of clipper 58 as was explained above. This signal is fed through contacts 80 and 82 to gate 78. Assuming that the sweep frequency of the vidicon is 60 cycles per second and that the circuit 76 is set to count 60 pulses, an output pulse will be produced by circuit 76 once each second. As was mentioned above, this pulse is fed through the one-shoe multivibrator 102 which then opens gate 78 to allow the 60th group of pulses from clipper 58 to pass to the N-period averaging decade 106. This action will continue with the gate passing one group of pulses from clipper 58 once each second. If the object is moving at the rate of two inches per second as was mentioned above, then a sample of the width of the object will be obtained every two inches.

The N-period averaging decade 106 then divides the number of pulses in each group by ten. While the N-period averaging decade 106 is dividing each group of pulses from gate 78, the pulses from circuit 76 are also applied to the N-count preset gate 110. This counter will energize relay 74 to open contacts 72 and 82 after ten groups of pulses in wave form J have passed to the N-period averaging decade 106. Thus, while the N-period averaging decade 106 divides ten groups of pulses by ten, the number of pulses fed to the circuit is multiplied by ten before the contacts 72 and 82 open to stop the counting action. One group of pulses passing through gate 78 may contain 50 pulses, while the next group may contain 48, while still the next group may contain 53. Since each group is divided by ten and effectively multiplied by ten before the contacts 72 and 82 open, an average number of pulses for the ten selected groups will appear at the output of circuit 106. This average number of pulses is then fed to counter 108 which gives a visual indication of the average width of the object 10 in feet and inches.

Referring now to FIG. 3, another embodiment of the invention is shown which also employs a vidicon tube as an electron-optics pick-up device. Since many of the elements shown in FIG. 3 correspond to those shown in FIG. 1, they are identified by like reference numerals and are not described again in detail. In this case, however, it will be noted that the vidicon 14 includes a second pair of deflection coils 120 and 121 which are disposed at right angles to the deflection coils 32 and 34. The slab 10 is illustrated in this embodiment as traveling into or out of the plane of the drawing rather than parallel thereto as was the case in FIG. 1. Consequently, only one of the deflection coils 34 is shown in FIG. 3, it being understood that the second coil 32 will be directly behind the coil 34. The second pair of deflection coils 120 and 121 are connected in series across the output of a high frequency oscillator 122. As was the case with the embodiment shown in FIG. 1, the deflection coils 32 and 34 are connected in series across sawtooth generator 44 which is conrtolled by the pulse generator 42. The output of the pulse generator 42 appears as wave form A' in FIG. 5, and the output of the sawtooth generator appears as wave form B' in FIG. 5. It will be noted that these wave forms are identical to wave forms A and B shown in FIG. 2. The output of the high frequency oscillator 122 as applied to the second pair of deflection coils 120 and 121 will appear as wave form C' in FIG. 5.

The end surface or face of the envelope 16 shown in FIG. 3 is masked with opaque material as shown in FIG. 4 to permit only a narrow transparent band 124 to remain. This arrangement, of course, will permit only a narrow band of light to fall upon the signal plate 20 in the plane of the dimension being taken. That is, the narrow band of light falling on signal plate 20 will extend parallel to the width of object 10 in the illustrated embodiment. Actually, the narrow band of light falling on signal plate 20 will not extend along the entire length of the transparent band 124 shown in FIG. 4, but will only extend between the points d and e which are the edges of the irradiant or illuminated object 10.

With this arrangement, the electron beam produced by electron gun 18 is swept back and forth along the long transverse dimension of the slot 124 by the sawtooth wave form applied to deflection coils 32 and 34. At the same time, the electromagnetic field produced by the coils 120 and 121 at right angles to the field produced by coils 32 and 34 causes the electron beam to sweep back and forth across the short transverse dimension of the slot 124 in the manner shown in FIG. 4. As the electron beam oscillates back and forth over the edges of the slot 124 in traveling from one end of the slot to the other, pulses will be produced on the signal plate 20 when the beam is discharging the image between points d and e. Thus, the output video signal appearing on signal plate 20 will appear as wave form D' in FIG. 5 where a group of pulses is produced each time the electron beam sweeps from one end of the slot 124 to the other. The number of pulses produced is, of course, proportional to the width of the irradiant or illuminated object 10 since they are produced only between its edges. In FIG. 5 two cycles of operation are shown; and, thus, two groups of pulses are produced in wave form D' with the number of pulses in each group being proportional to the instantaneous width of the object 10. These pulses are passed through amplifier 126 and shaping circuit 128 to a counter 130. The counter 130 may be of the averaging type shown in FIG. 1; however, in the particular embodiment shown in FIG. 3, it comprises a simple counter which is reset after each sweep of the electron beam in vidicon 14. Thus, the output of pulse generator 42 is used to trigger multivibrator 132 which produces a pulse to reset counter 130 after each cycle of operation of the vidicon. The output of the counter 130 is then visually displayed in the display circuitry 134. In this case, display 134 gives the instantaneous width of the object 10 as contrasted with the average width produced by the counter 60 in FIG. 1. As will be understood, the particular type of counter used in either the embodiment of FIG. 1 or that of FIG. 3 will depend upon the specific requirements of the application at hand.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. Apparatus for measuring the edge-to-edge dimension of an article having a different light intensity than the background surrounding it comprising, in combination, an electron-optics device having a photosensitive signal plate therein, means for focusing an image of the article to be measured on the signal plate, means for scanning said signal plate with an electron beam along a line extending substantially parallel to the dimension being measured, means for modulating said electron beam whereby the electron beam will be interrupted at spaced intervals as it scans across the signal plate to produce a pulsed output signal in which the number of pulses of amplitude determined by the light intensity of said article is proportional to the dimension being measured, and circuit apparatus for counting said output pulses.

2. Apparatus for measuring the edge-to-edge dimension of an article having a different light intensity than the background surrounding it comprising, in combination, an electron-optics device having a photosensitive signal plate therein, means for focusing an image of the article to be measured on the signal plate, an electron gun for directing an electron beam against said signal plate, a control grid in the electron gun, a source of oscillatory voltage coupled to the control grid whereby the electron beam will be interrupted at periodic intervals, means for sweeping said electron beam across said signal plate along a line extending substantially parallel to the dimension being measured, and counter means coupled to said signal plate for indicating the number of pulses produced thereon as the interrupted electron beam sweeps across the signal plate between the edges of said image.

3. Apparatus for measuring the edge-to-edge dimension of an article having a different light intensity than the background surrounding it comprising, in combination, an electron-optics device having a photosensitive signal plate therein, means for focusing an image of the article to be measured on the signal plate, an electron gun for directing an electron beam against said signal plate, a control grid in the electron gun, a source of oscillatory voltage coupled to the control grid whereby the electron beam will be interrupted at periodic intervals, a pair of deflection coils on opposite sides of said electron-optics device, means for applying a sawtooth waveform to said deflection coils to periodically sweep said electron beam across the signal plate along a line extending substantially parallel to the dimension being measured, and counter means coupled to said signal plate for indicating the number of pulses produced thereon as the interrupted electron beam sweeps across the signal plate between the edges of said image.

4. Apparatus for determining the average edge-to-edge dimension of an article which is moving in a direction perpendicular to the dimension which is to be measured comprising, in combination, an electron-optics device for scanning an image of the surface of said article with an electron beam along a path extending parallel to the dimension being determined, means for modulating said electron beam to produce an output video signal from the electron-optics device in which a group of pulses of predetermined amplitude is produced during each scan cycle of the electron beam with the number of pulses in each group being proportional to the length of the dimension scanned, means including a counting device for producing a gating pulse in response to a predetermined number of scan cycles of said electron beam, means for gating the groups of pulses in said video signal with said gating pulse, and a device for counting the pulses passing through said gating means.

5. Apparatus for determining the average edge-to-edge dimension of an article which is moving in a direction perpendicular to the direction which is to be measured comprising, in combination, an electron-optics device for scanning an image of the surface of said article with an electron beam along a path extending substantially parallel to the dimension being determined, means for modulating said electron beam to produce an output video signal from the electron-optics device in which a group of pulses of predetermined amplitude is produced during each scan cycle of the electron beam with the number of pulses in each group being proportional to the length of the dimension scanned, means for producing a train of voltage pulses having a pulse repetition frequency equal to the scan frequency of said electron beam, means including a first counting device for producing a gating pulse in response to a predetermined number of pulses in said train of pulses, means for gating the groups of pulses in said video signal with said gating pulse, a second counting device for counting the pulses passing through said gating means, and apparatus for resetting said first and second counting devices when the leading edge of said moving article is initially scanned by said electron beam.

6. Apparatus for measuring the edge-to-edge dimension of an article having a different light intensity than the background surrounding it comprising, in combination, means including an electron-optics device for scanning an image of said article with an electron beam along a path extending substantially parallel to said dimension, a source of oscillatory voltage, means for modulating said electron beam with said oscillatory voltage to produce a pulsed output video signal during the scan cycle of the electron beam when it intersects the image of said article, means for counting the pulses in said output video signal, and means for resetting said counting means at the completion of each scan cycle of the electron beam.

7. Apparatus for measuring the edge-to-edge dimension of an article having a different light intensity than the background surrounding it comprising, in combination, an electron-optics device having a signal plate therein, means for masking the face of said electron-optics device to permit only a narrow band of light to fall upon the photosensitive signal plate, means for focusing an image of at least a portion of the article being measured on the signal plate whereby the image will lie in said narrow band of light and the dimension being measured will extend parallel to said narrow band of light, means in the electron-optics device for directing an electron beam against said signal plate, means for sweeping said electron beam across the signal plate from one end of said narrow band to the other, means for modulating said electron beam with an oscillatory signal at right angles to said band of light whereby the electron beam will oscillate back and forth across the light band as it travels from one end of the band to the other, the arrangement being such that a plurality of pulses will appear at the output of the electron-optics device as the electron beam scans from one edge of the dimension being measured to the other edge, the number of pulses produced being proportional to said dimension, and means for counting said pulses.

8. Apparatus for measuring the edge-to-edge dimension of an article having a different light intensity than the background surrounding it comprising, in combination, an electron-optics device having a photosensitive signal plate therein and an outer envelope which permits only a narrow band of light to fall upon the photosensitive signal plate, means for focusing at least a portion of the image of the article being measured on the signal plate whereby the image will lie in said narrow band of light and the dimension being measured will extend parallel to said narrow band, an electron gun in the electron-optics device for directing an electron beam against said signal plate, a first pair of deflection coils at opposite ends of said narrow band of light, a second pair of deflection coils on either side of the band of light and arranged to produce an electromagnetic field at right angles to the electromagnetic field produced by said first pair of deflection coils, means for applying an oscillatory signal to said first pair of deflection coils, means for applying a sawtooth waveform to said second pair of deflection coils, and pulse counting means coupled to said signal plate.

9. Apparatus for measuring the edge-to-edge dimension of an article having a different light intensity than the background surrounding it comprising, in combination, an electron-optics device having a photosensitive signal plate therein and an outer envelope which permits only a narrow band of light to fall upon the photosensitive signal plate, means for focusing at least a portion of the image of the article being measured on the signal plate whereby the image will lie in said narrow band of light and the dimension being measured will extend parallel to said narrow band of light, means in the electron-optics device for directing an electron beam against said signal plate, apparatus for controlling said electron beam whereby it will oscillate back and forth across the light band as it travels from one end of said light band to the other to produce a plurality of pulses at the output of the electron-optics device as the electron beam scans from one edge of the dimension being measured to the other edge, and pulse counting means coupled to said signal plate.

10. In apparatus for measuring the edge-to-edge dimension of an article having a different light intensity than the background surrounding it, the combination of an electron-optics device having a photosensitive signal plate therein, opaque masking means between the signal plate and said article, said masking means having a slot therein extending parallel to the dimension being measured to permit a narrow band of light to fall upon the photosensitive signal plate with the band of light also extending parallel to the dimension being measured, means in the electron-optics device for directing an electron beam against said signal plate, means for controlling said electron beam whereby it will move from one end of said band of light to the other, and means for controlling said electron beam whereby it will oscillate back and forth across the light band as it travels from one end of the light band to the other to produce an output video signal on said signal plate in which pulses of predetermined amplitude are produced whenever said oscillating electron beam scans a portion of said narrow band of light having a greater light intensity than the remainder thereof.

11. In apparatus for measuring the edge-to-edge dimension of an article having a different light intensity than the background surrounding it, the combination of an electron-optics device having a photosensitive signal plate therein, opaque masking means between the signal plate and said articles, the masking means having a slot therein extending parallel to the dimension being measured whereby a band of light also extending parallel to the dimension being measured will fall upon said signal plate, means for focusing an image of said article upon said signal plate as viewed through said slot, and means for scanning said narrow band of light with an electron beam whereby the electron beam will scan across the narrow band of light at spaced points along paths extending transverse to the longest dimension of said narrow band of light.

References Cited in the file of this patent
UNITED STATES PATENTS

| | | |
|---|---|---|
| 2,431,824 | Poch | Dec. 2, 1947 |
| 2,494,441 | Hillier | Jan. 10, 1950 |
| 2,674,915 | Anderson | Apr. 14, 1954 |
| 2,756,627 | Boycks | July 31, 1956 |
| 2,803,755 | Milford | Aug. 20, 1957 |
| 2,907,519 | Covely | Oct. 6, 1959 |
| 2,910,908 | Meyer | Nov. 3, 1959 |
| 2,959,349 | Marsh et al. | Nov. 8, 1960 |